March 8, 1949. F. A. HOGLAN 2,463,877
PRODUCTION OF GLUTAMIC ACID AND SALTS THEREOF
Filed Feb. 12, 1947 2 Sheets-Sheet 1

INVENTOR
FOREST A. HOGLAN

BY Ernest V. Haines
ATTORNEY

March 8, 1949.  F. A. HOGLAN  2,463,877
PRODUCTION OF GLUTAMIC ACID AND SALTS THEREOF
Filed Feb. 12, 1947  2 Sheets-Sheet 2

INVENTOR
FOREST A. HOGLAN
By Ernest V. Hains
ATTORNEY

Patented Mar. 8, 1949

2,463,877

UNITED STATES PATENT OFFICE 2,463,877

PRODUCTION OF GLUTAMIC ACID AND SALTS THEREOF

Forest A. Hoglan, Toledo, Ohio, assignor to International Minerals and Chemical Corporation, a corporation of New York Application February 12, 1947, Serial No. 728,086

11 Claims. (Cl. 260—529)

This invention relates to the production of glutamic acid and salts thereof. More particularly, the invention relates to the production of pharmaceutically pure and edible glutamic acid and to the production of the monosodium salt of glutamic acid.

The production of glutamic acid and the salts thereof has been carried out in the past by means of numerous processes, depending upon the particular source of proteinaceous material employed in the hydrolysis step. Thus, for example, Steffen's filtrate from the manufacture of sugar from sugar beets, corn gluten, wheat gluten, and other similar proteinaceous materials have been employed. In practicing the various processes required for the isolation and purification of glutamic acid therefrom, and for the conversion of such glutamic acid into monosodium glutamate, the yields obtained have frequently been low, frequently of the order of between about 50 and about 70% by weight of the total glutamic acid originally contained in the proteinaceous substances processed. In many instances expensive equipment and reagents employed have raised production costs to a prohibitively high level. The development of a cheap commercial process for the efficient recovery of substantially pure glutamic acid and its monosodium derivative is highly desirable. For example, in the recovery of glutamic acid and/or monosodium glutamate from gluten, either wheat or corn, a number of separate and distinct procedural steps have heretofore been required in order to isolate or segregate from the crude hydrolysate the bulk of the contaminating amino acids produced during the hydrolysis, these amino acids being those other than glutamic acid and comprising to a large extent tyrosine, leucine, isoleucine, phenylalanine, methionine, etc. For example, one process now used for the segregation of glutamic acid from gluten makes it necessary to effect two concentration operations after first effecting hydrolysis with a filtering operation following each concentration in order to be sure to remove all of the water soluble inorganic salts contained therein and at the same time to be sure to remove substantially all of the tyrosine, leucine and related amino acids other than glutamic acid from the hydrolysate. In addition, although glutamic acid of the order of 93–95% purity may be obtained by the repeated crystallization of the glutamic acid crystals, such purity is not sufficient to constitute the so-called "edible glutamic acid" of commerce, but the chief use of such glutamic acid is its conversion into the monosodium salt with the product then being sold in commerce as monosodium glutamate for use as a flavoring material.

It is an object of the present invention to produce glutamic acid of a relatively high degree of purity to be sold in commerce as "edible glutamic acid."

It is a further object of the present invention to provide an improved process for the hydrolysis of cereal glutens in order to obtain improved yields of glutamic acid and/or the monosodium salt thereof while at the same time lowering the overall cost of producing the same.

It is a further object of the invention to remove from the hydrolysate in a single operation the major portion of the more insoluble amino acids produced during the hydrolysis, with the exception of glutamic acid, and to recover the glutamic acid as a subsequent step or steps in the process. Other objects of the present invention will be apparent on a fuller understanding of the process as described in greater detail hereinafter.

Upon the hydrolysis of the cereal gluten such as corn gluten or wheat gluten with a strong mineral acid such as, for example, hydrochloric acid or sulfuric acid, a variety of products are produced among which may be mentioned humin— a dark, slimy material which is relatively difficult to filter from the solution, ammonia, a considerable amount of amino acids other than glutamic acid, and after neutralization of the hydrolysate with a suitable alkali such as sodium hydroxide or sodium carbonate, a quantity of sodium chloride. This mixture must be processed in order to segregate and then to purify the glutamic acid produced, and the operations involved in this segregation and purification must of necessity be correlated with respect to one another so as to involve a minimum amount of chemical reagents which are expensive, and at the same time involve a maximum amount of purified glutamic acid and/or its monosodium derivative. In order to clearly set forth the process which accomplishes these objects and results, reference is made to Figures 1 and 2 of the accompanying drawings, said figures being more or less diagrammatical representations of flow sheets illustrating the processes employed.

Figure 1:
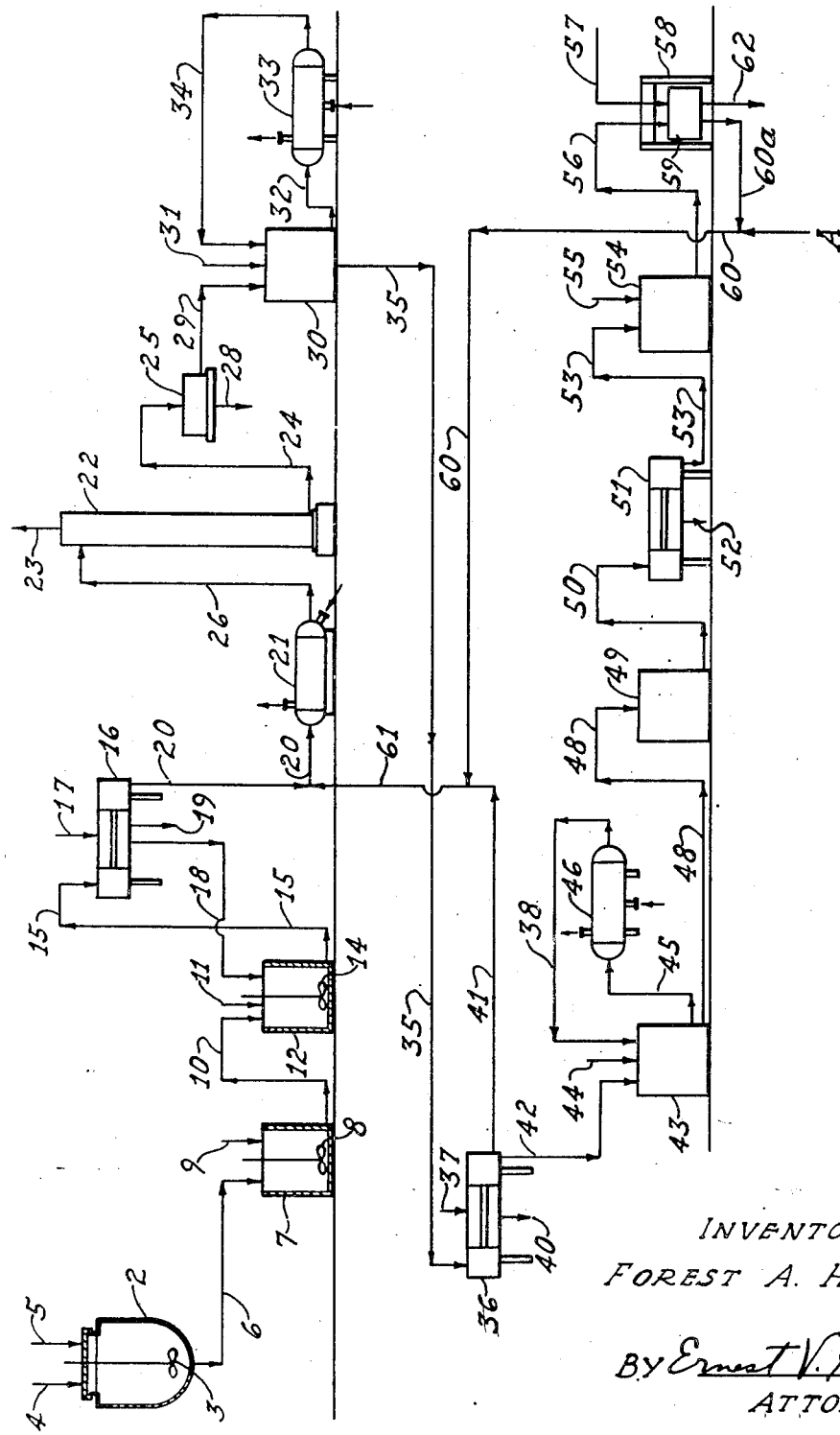
Figure 1 represents such a flow sheet for the production of crude glutamic acid.

Referring now to Figure 1, and by way of example only with no intention of limiting the invention thereto, the following description is presented. A charge of wheat gluten is introduced by means of line 4 into hydrolyzer 2 which is equipped with a stirrer or other agitator 3. By means of line 5 there is introduced into hydrolyzer 2 a suitable amount of strong mineral acid such as aqueous hydrochloric acid. Under elevated temperatures and pressures, and after a sufficient length of time to substantially complete the hydrolysis, the wheat gluten is hydrolyzed by means of the hydrochloric acid. The hydrolysate is then conducted by means of line 6 into adjusting tank 7, also equipped with a suitable agitator means 8, to which tank by means of line 9 an amount of aqueous caustic soda is added sufficient to bring the pH of the solution to between about 6 and about 6.4. The material is then conducted by means of line 10 into surge tank 12 equipped with agitator means 14 and from there is conducted by means of line 15 into filter press 16 where the humin is removed from the solution and is removed from the system by means of line 19. A backwash is passed through the filter cakes or filter clothes containing the filter cake by means of line 17, the washings being removed from the filter press through line 18 and thereby returning to the surge tank 12. The filtrate is then conducted by means of line 20 through preheater 21 through line 26 into evaporator or still 22, which is held under a suitable vacuum. In evaporator 22 the solution is concentrated with vapors being removed through line 23. The concentration is continued until such time as incipient crystallization of the inorganic salts is effected at which time the concentrate is removed from evaporator 22 by means of line 24, and with or without cooling, preferably the latter, passed through centrifuge 25 where the inorganic salts are removed through line 28. The filtrate is then passed by means of line 29 into precipitating tank 30 equipped with an adjacent cooling coil 33 which cools the solution passing from precipitating tank 30 into cooler 33 by means of line 32 and returning to precipitating tank 30 by means of line 34. While the filtrate is in precipitating tank 30 and while it is being cooled, aqueous caustic soda is added through line 31 in a sufficient amount to readjust the pH of the solution to between about 6 and 6.4, and once sufficient crystallization has taken place the slurry is removed by means of line 35 and passed through filter press 36 for the removal of the tyrosine, leucine and other amino acids other than glutamic acid. Here again as in the case of filter press 16 a backwash of the filter cake and filter cloth is effected by means of line 37 and line 41, the washings being returned to the system through lines 61 and 20 ahead of the preheater 21 and evaporator 22. The so-called tyrosine-leucine cake is removed from the filter press by means of line 40 and the filtrate, substantially completely free of the more insoluble amino acids other than glutamic acid, is passed to adjusting tank 43 by means of line 42. Adjusting tank 43 has in conjunction with it cooler 46 and the filtrate therein is passed through cooler 46 by means of line 45 and returned to adjusting tank 43 by means of line 38. The filtrate, while in adjusting tank 43, has admixed therewith an aqueous strong mineral acid such as hydrochloric acid or sulfuric acid, preferably the former, which is introduced into the system by means of line 44. Sufficient acid is introduced to give a pH to the solution of between about 3 and about 3.2. The pH adjusted filtrate upon reaching room temperature or thereabouts is conducted by means of line 48 into crystallizing tank 49 where it is allowed to stand for a sufficient length of time to induce a good set of crystals after which the slurry is passed by means of line 50 into filter press 51. The end liquor from filter press 51 is discarded from the system by means of line 52. The crude glutamic acid crystals are removed from filter press 51 by means of line 53 and are introduced into a repulp tank 54 wherein hot water is added by means of line 55 and the slurry of crystals and water is introduced by means of line 56 into centrifuge 58 equipped with a rotating basket 59. The crude cake is washed with water introduced through line 57 with the filtrate and washings being re-introduced into the system by means of lines 60a, 60, 61, and 20 ahead of the preheater 21 and evaporator 22 as in the case of the washings which are combined therewith and which come from the filter press 36. The crude glutamic acid crystals are removed from the system through line 62.

Figure 2:
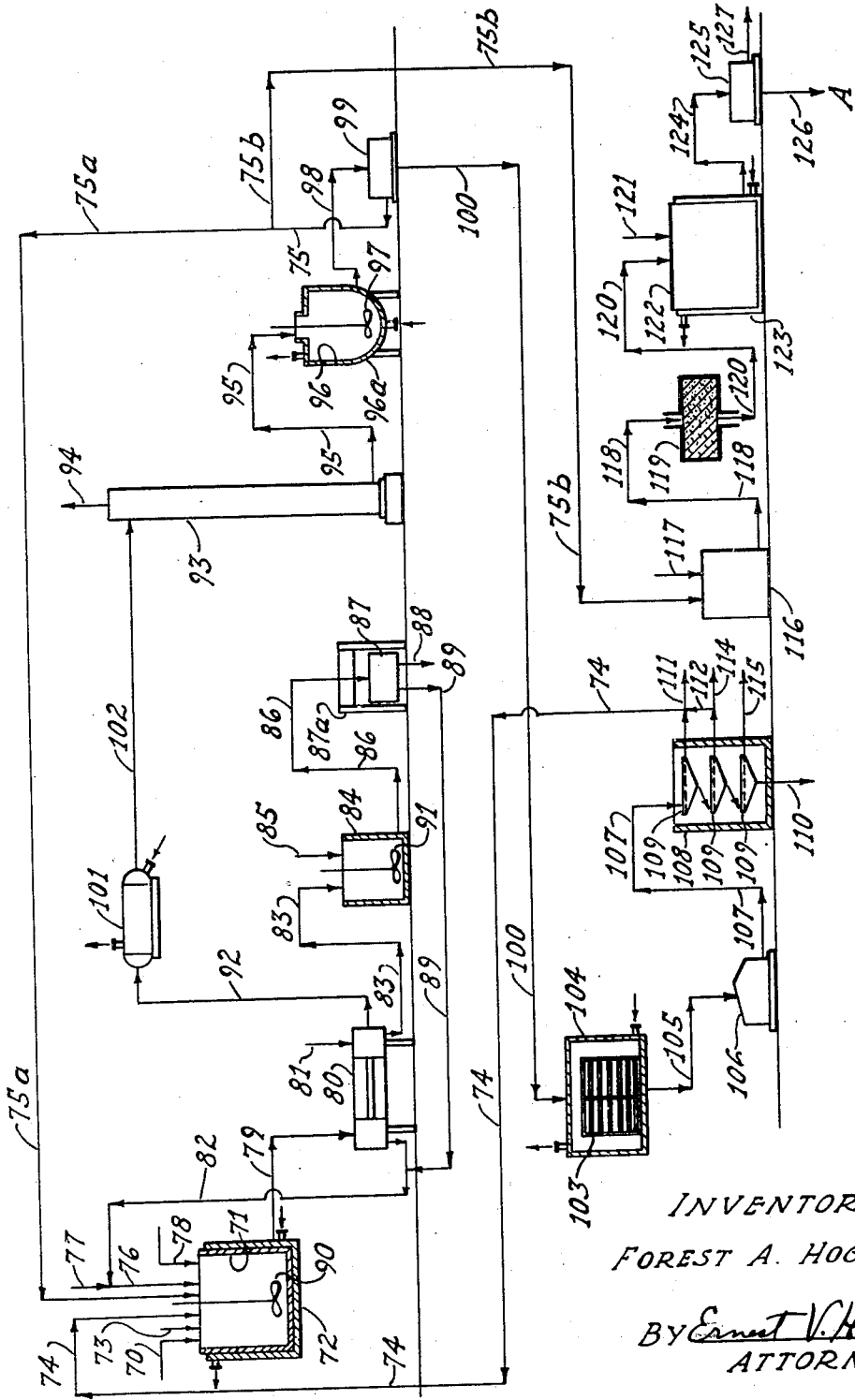
Figure 2 represents such a flow sheet for the production of the so-called edible glutamic acid and for the production of monosodium glutamate in saleable form.

Referring now to Figure 2, crude glutamic acid from any source, is introduced into mixing tank 71 equipped with a steam jacket 72 wherein under moderately elevated temperature the crude glutamic acid is introduced by means of line 70 and a decolorizing agent such as carbon together with filter aid is introduced into the tank 71 by means of line 73. Mixing tank 71 is equipped with a suitable agitation means 90 for thorough mixing of the ingredients. Sodium hydroxide is also introduced into the mixing tank 71 by means of line 78 and water introduced into the same tank by means of lines 76 and 77. The various ingredients are added so as to give a nearly neutral solution which after thorough mixing and after dissolution of the crude glutamic acid is introduced by means of line 79 into filter press 80 where the filter aid and decolorizing agent is removed from the solution. A water backwash of the filter cake and filter canvas is provided by means of line 81 and the washings are re-introduced into mixing tank 71 by means of lines 82 and 76 in order to recover all traces of glutamic acid and/or monosodium glutamate or other suitable metal salt of glutamic acid. If an alkali other than sodium hydroxide has been used, the filter aid and carbon forming the precipitate which is collected in filter press 80 is introduced into repulp tank 84 as indicated by line 83. Water is introduced also into this tank by means of line 85 and a suitable agitator 91 is employed to obtain a thorough mixing of the water and the decolorizing materials. This slurry is then conducted by means of line 86 into basket centrifuge 87a equipped with basket 87, the filtrate therefrom being re-introduced into mixing tank 71 by means of lines 89, 82 and 76, while the solids are removed from the system by means of line 88 and discarded or re-used in the system with additional batches introduced into mixing tank 71, the filtrate emerging from filter press 80 through line 92 is passed through preheater 101 where the temperature is brought up to a suitable extent and the solution is then passed by means of line 102 into an evaporator 93 which is maintained under a vacuum with the off vapors being removed from the system through line 94. After the liquid in evaporator 93 has been concentrated sufficiently, corresponding to about that of incipient crystallization, it is conducted by means of line 95 into a jacketed crystallizing pan or trough, or a plurality of such pans or troughs, as represented by 96 and jacket 96a. Mild agitation of the contents of crystallizer 96 is accomplished by means of a suitable agitator such as agitator 97. The jacket 96a is supplied with cold brine or tap water which is sufficiently cool to materially lower the temperature. The slurry of crystals and mother liquor is then conducted by means of line 98 into centrifuge 99, the mother liquor being returned to the original mixing tank 71 by means of lines 75 and 75a. The crystals of monosodium glutamate are removed from the centrifuge 99 which is preferably of the basket type and introduced into the dryer 103 as indicated by line 100. Dryer 103 is equipped with a jacket 104 through which hot gases or steam may be introduced in order to effectively dry the monosodium glutamate crystals.

After the crystals of monosodium glutamate are dry they are conducted by line 105 into a suitable conventional pulverizer 106 after which they are introduced into a succession of screens 109 in screening device 108. The pulverized monosodium glutamate is conducted from pulverizer 106 into screening device 108 as represented by line 107. Screens 109 range in mesh (top to bottom) from coarse to fine. The coarser particles are removed from the topmost screen 109 through line 111 and may be discarded from the system or used as such, or they may be conducted back into mixing tank 71 as shown by line 74. The same is true of the screenings collected on the intermediate screen 109. These may be removed from the system for packaging and sale through line 114 or if they are not of a sufficient degree of fineness, may either be returned as shown by lines 112 and 74 to mixing tank 71 for re-processing or they may be subjected to a further pulverizing treatment in pulverizer 106 or another pulverizer (not shown). The material retained on the bottom screen 109 and the material passing through all of the screens 109 in succession is collected and removed from the system by means of lines 115 and 110 respectively. This material is packaged or shipped in bulk for use in the food industry.

A portion or all of the mother liquor coming from centrifuge 99 through line 75 may be diverted from its return to mixing tank 71, through line 75a, by conducting the same into line 75b, and from there into the surge tank and decolorizer 116. By means of line 117, a decolorizing agent such as charcoal is added and thoroughly mixed with the mother liquor from the crystallizing pan 96. This slurry is then conducted by means of line 118 into filter 119 and the solids-free filtrate is then conducted in acidifying and mixing tank 122 by means of line 120. Mixing tank 122 has a jacket 123 and is provided with a cooling liquid in order to prevent a rise in temperature and in order to cool the contents thereof. The monosodium glutamate solution in the mixing tank 122 is acidified with a suitable non-oxidizing, strong mineral acid, for example aqueous hydrochloric acid, which is introduced into the tank by means of line 121. After the mixture has become sufficiently cooled to effect crystallization, the slurry is withdrawn from mixing tank 122 by means of line 124 and conducted into centrifuge 125. Sufficient acid is added into the mixing tank 122 to give a pH to the mixture of between about 3 and about 3.2. The slurry of glutamic acid crystals centrifuged in centrifuge 125 yields a filtrate through line 126 and edible or pharmaceutical grade glutamic acid through line 127. The filtrate evolved from the system at point A in line 126 is joined with point A of line 60 in Figure 1 so that the residual glutamic acid together with any sodium chloride which is built up in the system is re-processed according to the process outlined in Figure 1. Intermediate point A of Figure 2 and point A of Figure 1, the filtrate is adjusted with caustic soda or other suitable alkali to a pH of between about 6 and about 6.4 so that its introduction into lines 60 and 20 of Figure 1 does not materially alter the pH of the solution entering evaporator 22 by means of line 26. Alternatively, instead of returning filtrate to tank 71 through line 75a this filtrate may be returned to the system shown in Figure 1 by connecting line 75a of Figure 2 with line 60 (point A) of Figure 1 after first adjusting the pH.

In considering the process as outlined in Figures 1 and 2 of the accompanying drawings, a single mixing tank, filter, centrifuge, evaporator, crystallizer, etc., has been shown. It is to be understood, however, that various deviations and modifications from the above process flow plan may be instituted without departing from the spirit of the invention as herein described. In fact, it is desirable and preferable procedure to employ a plurality of such units so that a continuous or semi-continuous operation is possible. Thus, instead of employing one hydrolyzer 2 for the original hydrolysis of the gluten a battery of hydrolyzers may be employed. These may be employed to afford a series or parallel operation. By so doing, it is not necessary to shut down hydrolyzer 2 and the following steps while the hydrolyzer is being re-charged for the preparation of additional batches of the hydrolysate. A parallel operation of a plurality of hydrolyzers will permit a more or less continuous flow of substantially completely hydrolyzed gluten to the mixing tanks, surge tanks, filter presses, etc. The same is true of the centrifuges and evaporators. A series operation of a plurality of evaporators and centrifuges, or a parallel plurality of centrifuges and evaporators is contemplated to afford a continuous and/or semi-continuous operation. No special type of lines or equipment is required to carry out the above described processes except, however, that in cases where strong mineral acids or solutions containing strong mineral acids, strong alkalis or solutions containing strong alkalis are encountered, the lines and equipment should be constructed of or lined with chemically resistant metals, porcelain, tile or other suitable material commonly employed where corrosive substances are used.

*Example*

A charge of about 3400 lbs. of wheat gluten is added to about 6800 lbs. of 26% aqueous hydrochloric acid and the same hydrolyzed under autogenous pressure at a temperature of about 120° C. for a period of about 2½ to 3 hours. The material is then cooled and adjusted with 50% aqueous sodium hydroxide solution in the amount of about 3900 to about 4000 lbs. to a pH of about 6 to about 6.4. A small amount of filter aid is added or, if desired, a small amount of tannin or tannic acid is added either at this point or during the original hydrolysis, and the slurry filtered by means of a filter press under a maximum pressure of 30 lbs. per square inch maintained on the incoming slurry. The filtrate is then conducted through a preheater maintained at a temperature of about 75° C. and into an evaporator maintained under a vacuum of about 26 inches of mercury, where the solution is flash evaporated to a density reading of about 1.280 specific gravity at 60° C. in clear solution, that is with any salt crystals contained therein settled out. The material is then centrifuged at a temperature of about 50 to 60° C. to remove the salts from this concentrated solution and an additional quantity of 50% aqueous sodium hydroxide is directly added to the salt-free solution while cooling the same to maintain about room temperature. Usually about 1 lb. of 50% aqueous sodium hydroxide per 200 lbs. of solution is sufficient to accomplish the direct readjustment of the pH back to between about 6 and about 6.4. The readjusted solution is permitted to stand preferably at or about room temperature for a period of between about 2 and 16 hours, depending upon the temperature and the particular batch conditions obtaining, to allow the insoluble amino acids other than the glutamic acid values contained in the solution, to precipitate. There is also additional precipitation of salt, humin, etc., at this stage. The solution so treated is then directly filtered to remove the amino acid values other than glutamic acid values. As above stated, these are chiefly tyrosine, leucine, isoleucine, humin, salt, etc. The filter press is operated in this step under about the same incoming pressure of liquid as above mentioned, and the amino acid precipitate is washed with cold water to remove any traces of mother liquor therefrom. The filtrate is then directly treated with roughly 800 lbs. of about 34% HCl, or in any event with sufficient aqueous hydrochloric acid to give a pH in the solution of between about 3 and 3.2, while cooling the solution so as to maintain approximately room temperature, in the crystallizing tank. Agitation may be employed while maintaining the solution at approximately room temperature. After a sufficient length of time, usually about 72 hours or so, or in any event a sufficient length of time to insure substantial crystallization, the slurry containing the glutamic acid crystals is filtered by means of a plate and frame filter press, or any other suitable type of filtering apparatus, and the crystals are submitted to a repulping operation using about an equal weight of hot water held at about 60° C. for ½ hour. This slurry is then centrifuged in a basket type centrifuge, the crystals washed with a fine spray of hot water to free the crystals of any end liquor and the crude glutamic acid crystals are then recovered in the amount of about 1,000 lbs. containing 15 to 20% moisture for further processing as shown in Figure 2. On a dry basis, the crude glutamic acid is about 95% pure.

Crude glutamic acid in the amount of about 1,000 lbs. of weight cake and containing about 2% sodium chloride, as well as small amounts of amino acids other than glutamic acid, is dissolved in an admixture of about 1,000 lbs. of water and about 50% of aqueous sodium hydroxide solution or, in any case, sufficient sodium hydroxide solution to give a pH of about 7 to the solution. In addition to this mixture, and as indicated in Figure 2, any available amounts of monosodium glutamate mother liquor (line 75a and tank 71 of Figure 2) are likewise added while maintaining a temperature of about 60° C. During the agitation, a suitable amount of decolorizing charcoal or carbon and filter aid, usually about 100 lbs. of each being sufficient, is added and thoroughly mixed therewith. The slurry is then filtered in a plate and frame filter press and the filter cake washed with water to recover any glutamic acid or monosodium glutamate therefrom. The solution is then preheated to a maximum temperature of no more than 70° C. and flash evaporated under a vacuum of about 26 inches of mercury to a point of incipient monosodium glutamate crystallization, this being usually to a point of 60 to 61% dry solid material in solution. The slurry is then conducted to crystallizing pans which are cooled at a temperature of about 35° C. The material is held in these pans for about 16 hours under very slow or mild agitation to allow substantially complete crystallization of the monosodium glutamate. The slurry is then centrifuged with the solids being subjected to drying in a tray dryer or other suitable dryer, usually having a temperature of 95 to 100° C., although this temperature is not critical. If desired, a vacuum dryer may be employed in which case a much lower temperature may be employed with good results. The mother liquor, as above stated, is returned to the original mixing step to recover monosodium glutamate therefrom.

Of the original 1,000 lbs. of crude wet (containing approximately 17% moisture) glutamic acid processed a recovery of about 1,000 lbs. of dry monosodium glutamate is obtained. This is pulverized, screened and prepared for shipment in conventional manner.

Having now thus fully described and illustrated the character of the invention, what is desired to be secured by Letters Patent is:

1. A process which comprises hydrolzing gluten with hydrochloric acid adding caustic soda to said hydrolysate to give a pH of between about 6.0 and about 6.4 filtering humin from the partially neutralized hydrolysate, concentrating the filtrate to the point of incipient crystallization of sodium salts, filtering salts from the said concentrate, directly readjusting the pH of the filtrate to between about 6.0 and about 6.4 while cooling the same, directly precipitating a mixture containing substantial amounts of amino acid values other than glutamic acid values, filtering the precipitated amino acid values and treating the resultant solution with hydrochloric acid to give a pH between about 3.0 and about 3.2, adjusting the resultant mixture to about room temperature crystallizing glutamic acid from the said mixture, separating crude glutamic acid from the mother liquor, repulping the crude glutamic acid with hot water at about 60° C., separating crude glutamic acid therefrom and introducing the mother liquor from the repulping step into the above mentioned concentrating step.

2. A process which comprises hydrolyzing gluten with hydrochloric acid, adjusting the pH of the hydrolysate to between about 6.0 and about 6.4 with an inorganic sodium base separating humin from the pH adjusted hydrolysate, concentrating the filtrate about to the point of incipient crystallization, crystallizing salts therefrom, separating the crystals from the said concentrated filtrate, directly readjusting the filtrate to a pH between about 6.0 and about 6.4 while lowering the temperature thereof, directly precipitating a mixture of amino acid values other than substantial amounts of glutamic acid values, separating the precipitated amino acid values and removing glutamic acid values from the mother liquor.

3. A process as in claim 2 wherein at least a portion of the mother liquor remaining after the removing of glutamic acid values is returned to the filtrate concentration step.

4. A process as in claim 2 wherein at least a portion of the mother liquor remaining after the recovery of glutamic acid values is adjusted to a pH between about 6.0 and about 6.4 and returned to the filtrate concentration step.

5. A process which comprises hydrolyzing gluten with hydrochloric acid, adjusting the pH of the hydrolysate between about 6.0 and about 6.4 with caustic soda, separating humin from the pH adjusted hydrolysate, concentrating the filtrate about to the point of incipient crystallization, crystallizing salts therefrom, separating the crystals from the said concentrated filtrate, directly readjusting the filtrate to a pH between about 6.0 and about 6.4 while lowering the temperature thereof, directly precipitating a mixture of amino acid values other than substantial amounts of glutamic acid values, separating the precipitated amino acid values, recovering glutamic acid values from the mother liquor, dissolving the crude glutamic acid in aqueous alkali solution in an amount sufficient to give a substantially neutral solution, concentrating the filtrate about to the point of incipient crystallization, cooling the concentrated filtrate and crystallizing a mono alkali metal salt of glutamic acid therein, separating said salt from the said concentrated filtrate and drying the separated salt crystals.

6. A process which comprises hydrolyzing gluten with hydrochloric acid, adjusting the pH of the hydrolysate to between about 6.0 and about 6.4 with caustic soda, separating humin from the pH adjusted hydrolysate, concentrating the filtrate about to the point of incipient crystallization, crystallizing salts therefrom, separating the crystals from the said concentrated filtrate, directly readjusting the filtrate to a pH between about 6.0 and about 6.4 while lowering the temperature thereof, directly precipitating a mixture of amino acid values other than substantial amounts of glutamic acid values, separating the precipitated amino acid values, recovering glutamic acid values from the mother liquor, dissolving the crude glutamic acid in aqueous alkali solution in an amount sufficient to give a substantially neutral solution, concentrating the filtrate about to the point of incipient crystallization, cooling the concentrated filtrate and crystallizing a mono alkali metal salt of glutamic acid therein, separating said salt from the said concentrated filtrate, decolorizing the liquor after separating crystals of the alkali metal salt of glutamic acid therefrom, removing the decolorizing agent therefrom, acidifying the resultant solids-free solution with a non-oxidizing strong aqueous mineral acid to a pH between about 3.0 and about 3.2, crystallizing glutamic acid from the acidified solution and separating the crystals from the mother liquor.

7. A process which comprises hydrolyzing gluten with hydrochloric acid, adjusting the pH of the hydrolysate to between about 6.0 and about 6.4 with caustic soda separating humin from the pH adjusted hydrolysate, concentrating the filtrate about to the point of incipient crystallization, crystallizing salts therefrom, separating the crystals from the said concentrated filtrate, directly readjusting the filtrate to a pH between about 6.0 and about 6.4 while lowering the temperature thereof, directly precipitating a mixture of amino acid values other than substantial amounts of glutamic acid values, separating the precipitated amino acid values, recovering glutamic acid values from the mother liquor, dissolving the crude glutamic acid in aqueous alkali solution in an amount sufficient to give a substantially neutral solution, concentrating the filtrate about to the point of incipient crystallization, cooling the concentrated filtrated and crystallizing a mono alkali metal salt of glutamic acid therein, separating said salt from the said concentrated filtrate, decolorizing the liquor after separating crystals of the alkali metal salt of glutamic acid therefrom, removing the decolorizing agent therefrom, acidifying the solids-free solution with a non-oxidizing strong aqueous mineral acid to a pH between about 3.0 and about 3.2, crystallizing glutamic acid from the acidified solution, separating the crystals from the mother liquor and introducing the mother liquor adjusted to a pH of between 6.0 and about 6.4 into the feed to be concentrated to the point of incipient crystallization preparatory to removing salts therefrom and eventually recovering crude glutamic acid therefrom.

8. In a process for the production of glutamic acid involving the hydrochloric acid hydrolysis of vegetable portein and the successive removals of humin, sodium salts and amino acid values other than glutamic acid values from the partially neutralized hydrolysate prior to the isolation and recovery of glutamic acid, the improvements comprising effecting a single concentration of the hydrolysate, after removal of humin, about to the point of incipient crystallization of said salts, crystallizing and separating the said salts, directly cooling the solution and precipitating amino acid values other than glutamic acid values directly therein, and removing the so precipitated amino acids from the glutamic acid-containing solution.

9. In a process for the production of glutamic acid involving the hydrochloric acid hydrolysis of vegetable protein and the successive removals of humin, sodium salts and amino acid values other than glutamic acid values from the partially neutralized hydrolysate prior to the isolation and recovery of glutamic acid, the improvements comprising removing humin, effecting a single concentration of the hydrolysate, adjusted to a pH between about 6.0 and about 6.4 with caustic soda, about to the point of incipient crystallization of said salts, crystallizing and separating the said salts, readjusting the pH of the solution with a basic alkali metal compound to between about 6.0 and about 6.4, directly cooling the solution and directly precipitating and separating substantially all of the more insoluble amino acid values other than glutamic acid values from the solution in a single separation step.

10. In a process for the production of glutamic acid involving the hydrochloric acid, hydrolysis of vegetable protein and the successive removals of humin, sodium salts, and amino acid values other than glutamic acid values from the partially neutralized hydrolysate prior to the isolation and recovery of glutamic acid, the improvements comprising removing humin, effecting a single concentration of the hydrolysate, adjusted to a pH between about 6.0 and about 6.4 with aqueous caustic soda, about to the point of incipient crystallization of said salts, crystallizing and separating the said salts, readjusting the pH of the solution with aqueous caustic soda to between about 6.0 and about 6.4, directly cooling the solution and directly precipitating and separating substantially all of the more insoluble amino acid values other than glutamic acid values from the solution without further treatment of the solution.

11. In a process for the production of glutamic acid involving the hydrochloric acid, hydrolysis of wheat gluten and the successive removals of humin, sodium salts and the more insoluble amino acid values other than glutamic acid values from the partially neutralized hydrolysate prior to the isolation and recovery of glutamic acid, the improvements comprising removing humin, effecting a single concentration of the hydrolysate adjusted to a pH between about 6.0 and 6.4 with aqueous caustic soda, about to the point of incipient crystallization at a temperature of about 60° C., cooling the solution below about 60° C. but between about 50° and about 60° C., separating said salts therefrom, directly readjusting the pH of the solution to between about 6.0 and about 6.4 with aqueous caustic soda, directly cooling the solution to about room temperature or slightly above and allowing the same to stand for between about 2 and about 16 hours and separating substantially all of the more insoluble amino acid values other than glutamic acid values from the solution as a single separation step.

FOREST A. HOGLAN.

REFERENCES CITED

The following references are of record in the file of this patent:

UNITED STATES PATENTS

| Number | Name | Date |
|---|---|---|
| 2,050,491 | Kumagi | Aug. 11, 1936 |
| 2,347,220 | Shildneck | Apr. 25, 1944 |
| 2,373,342 | Royal | Apr. 10, 1945 |
| 2,405,574 | Gamma | Aug. 13, 1946 |